United States Patent [19]
Smith et al.

[11] Patent Number: 5,801,792
[45] Date of Patent: Sep. 1, 1998

[54] HIGH RESOLUTION, HIGH INTENSITY VIDEO PROJECTION CATHODE RAY TUBE PROVIDED WITH A COOLED REFLECTIVE PHOSPHOR SCREEN SUPPORT

[75] Inventors: Ceil E. Smith, Los Angeles, Calif.; Philip L. Writer, Marietta, Ga.; Frank A. Campbell, Pacific Palisades, Calif.

[73] Assignee: SWZ Engineering Ltd., Stamford, Conn.

[21] Appl. No.: 572,165

[22] Filed: Dec. 13, 1995

[51] Int. Cl.⁶ .............................. H04N 9/31; H01J 61/52
[52] U.S. Cl. .......................... 348/749; 348/748; 313/35
[58] Field of Search .............................. 348/749, 761, 348/748; 313/30–36

[56] References Cited

U.S. PATENT DOCUMENTS

| | | | |
|---|---|---|---|
| 4,150,396 | 4/1979 | Hareng et al. | 348/761 |
| 4,529,905 | 7/1985 | Ohkoshi et al. | 313/35 |
| 4,717,853 | 1/1988 | Ezawa et al. | 313/35 |
| 4,933,593 | 6/1990 | Gerritsen et al. | 313/35 |
| 5,159,230 | 10/1992 | Pais | 348/749 |
| 5,398,082 | 3/1995 | Henderson et al. | 348/761 |

Primary Examiner—Victor R. Kostak
Attorney, Agent, or Firm—Norbert P. Holler; Gottlieb, Rackman & Reisman, P.C.

[57] ABSTRACT

A single gun projection cathode ray tube (CRT) which permits the generation of high brightness image output. The crux of the invention is the provision, in the CRT, of an optically reflecting high thermal conductivity metal plate-like member positioned in the path of the electron beam, the surface of the metal plate-like member, which is directed toward both the electron gun and the faceplate of the CRT, being coated with a monochrome phosphor and being cooled by external means. The CRT is capable of producing monochrome images which are reflected by the phosphor-bearing surface of the metal plate-like member toward the faceplate of the CRT and, upon passing through the faceplate, may be projected directly onto a display screen. Alternatively, the CRT can produce projected field sequential color images when it is used either with a synchronized color wheel or with a synchronized liquid crystal shutter color filter interposed between the metal plate-like member of the CRT and the associated display screen.

22 Claims, 3 Drawing Sheets

FIG. 2
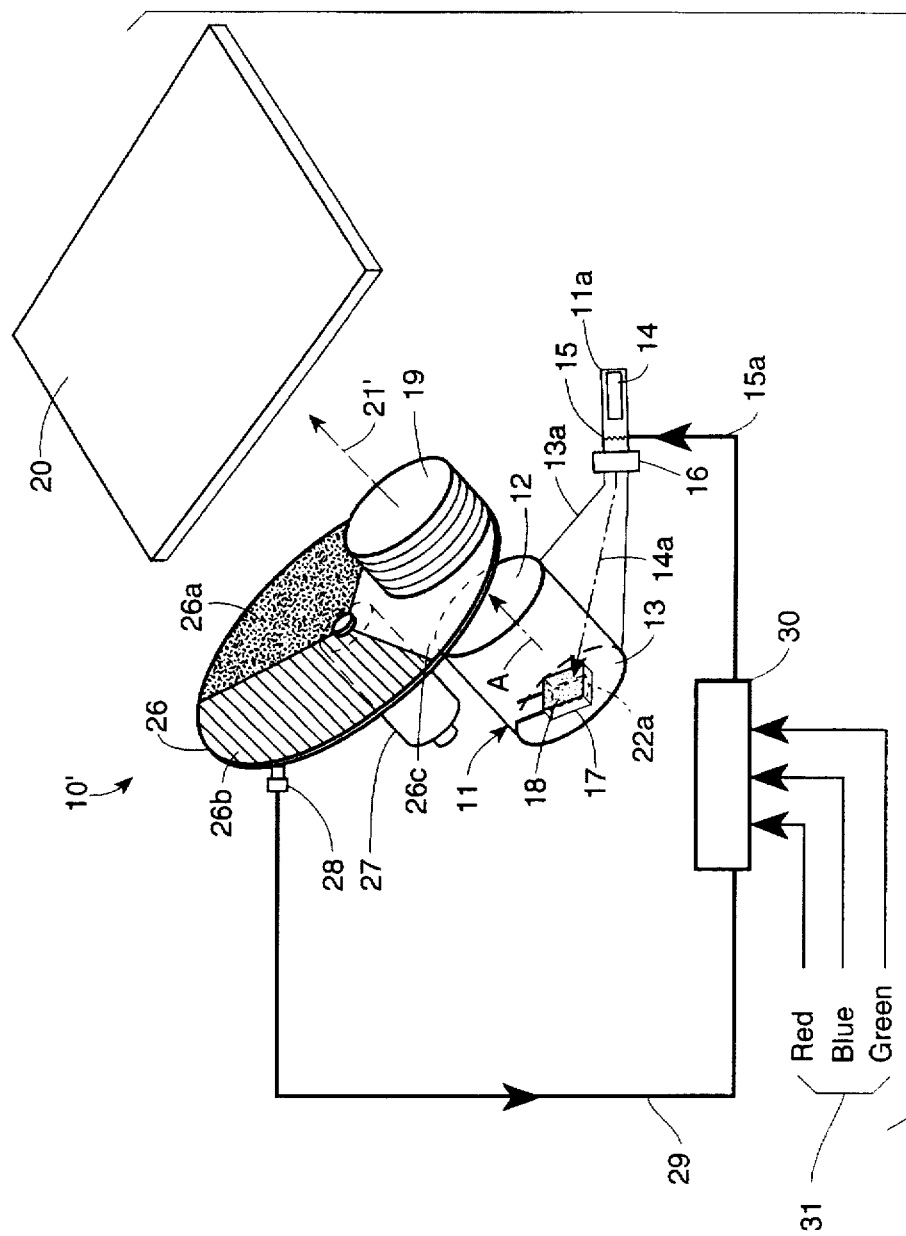
FIG. 4
FIG. 5
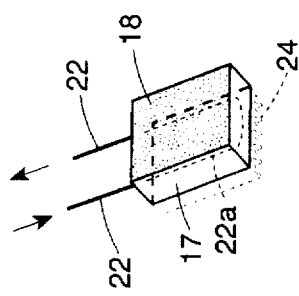

HIGH RESOLUTION, HIGH INTENSITY VIDEO PROJECTION CATHODE RAY TUBE PROVIDED WITH A COOLED REFLECTIVE PHOSPHOR SCREEN SUPPORT

FIELD OF THE INVENTION

This invention relates to a high resolution, high intensity video projection cathode ray tube (CRT) which is provided with a cooled plate-like member bearing a phosphor screen on an optically reflective surface thereof at a location remote from the faceplate of the CRT and allows the generation of high brightness image output.

BACKGROUND OF THE INVENTION

Current TV projection systems intended for large screen television, High Definition Television (HDTV) and theater projectors all have problems delivering high resolution images to the display screen with sufficient light output (brightness). The light output is limited by the amount of power of the electron beam that can be utilized by a conventional cathode ray tube having the light-producing phosphors deposited on the inside surface of the glass faceplate of the tube. High power levels applied to the phosphors on the faceplate may cause excessive heating of the faceplate, which can create significant thermal stresses between the faceplate and the cooler tube envelope that connects to the perimeter of the faceplate and may result in cracking of the faceplate or the envelope or both. Also, the high power level may cause a blurring or blooming of the image or possibly a burning of the phosphors.

Another problem frequently encountered relates to the temperature differential between the center and the edges of the faceplate, which causes thermal quenching in the phosphors. Thermal quenching is a phenomenon where the brightness of the light emitted by a phosphor decreases with increasing temperature. Typically the temperature at the center of the faceplate will be higher than at the edges where the adjoining envelope is much cooler, and thus the brightness of the emitted light will be lower in the center region of the faceplate than in its marginal regions.

Conventional practice to reduce these problems is to provide liquid cooling of the phosphor-bearing glass faceplate of the cathode ray tube. Representative systems of this type are disclosed, for example, in U.S. Pat. No. 4,529,905, U.S. Pat. No. 4,717,853 and U.S. Pat. No. 4,933,593. The basic drawback of these approaches is that the glass faceplate is a good thermal insulator, which makes it more difficult to cool the phosphor screen; in other words, the heat path must pass from the phosphor screen through the low thermal conductivity faceplate before it can reach the cooling medium, and the arrangement is, consequently, less able to remove heat from the phosphors. Also, the image must pass through the cooling liquid, which may result in image distortion or loss of brightness. Moreover, implementations of this type are complicated and, therefore, expensive.

It should be noted, in this regard, that existing high brightness or beam index type cathode ray tubes using liquid cooled faceplates are also not suitable for projection systems in HDTV sets or for theater projection, because of a lack of picture definition. Thus, although a CRT of this type is capable of delivering a very high light output, it has the problem that the black matrixing stripes placed between the phosphor stripes show up in the projected picture. Ordinarily, therefore, the exterior surface of the faceplate of the CRT is equipped with beveled striations placed so as to diffuse the effect of the black matrix stripes, but this seriously reduces the picture definition.

It has furthermore been found that a system utilizing three cathode ray tubes for projection TV is not capable of generating the necessary detail for HDTV set applications and cannot furnish the definition and light output needed for theater projection of high definition video. The U.S. motion picture industry currently spends half a billion dollars a year domestically making release prints that are unusable within a few weeks of their first use. For this reason, the industry has been working on developing electronic means capable of delivering and projecting high quality high light output images, but such means have been unable to produce an image quality equivalent to or better than that of film.

As is well known, a TV projection system using three separate cathode ray tubes has individual red, blue and green filters, and the images are combined on the display screen either through separate lens systems, or by means of a half-silvered mirror assembly and a single lens, to form the color picture. The inability of a three-tube system to achieve a high definition picture is due to problems in and the difficulty of converging the three primary color images, electronically and mechanically, on the display screen. The lack of necessary light output required for theater projection is caused by a limited maximum brilliance of the conventional cathode ray tubes. An electron beam of too high an intensity will burn the phosphors, since the glass faceplate is an excellent heat insulator and does not form an effective heat dissipation path between the phosphor screen and the external ambient air or between the phosphor screen and a liquid cooling unit. Even with three tubes furnishing their maximum brightness, such a system produces insufficient light output to compete with current film projector systems.

BRIEF DESCRIPTION OF THE INVENTION

The main object of the present invention is, therefore, to provide a simple high resolution, high intensity video projection cathode ray tube with a very high light output.

Correspondingly, it is an object of the invention to provide a system that produces a projected image superior to that currently obtained in projection TV or film projection.

More particularly, it is an object of the invention to provide a projection cathode ray tube which avoids the above-described drawbacks and disadvantages of the known cathode ray tubes and to that end is characterized by a phosphor screen which is so located in the CRT that heat is efficiently conducted away from the phosphor screen without reaching the faceplate of the CRT, thereby to allow higher intensity electron beams to be used and a correspondingly higher intensity light output to be obtained.

Generally speaking, the objectives of the present invention are achieved by a single-gun projection cathode ray tube in which the electron gun and its associated deflection yoke are arranged to aim the high intensity electron beam not toward the faceplate of the CRT but rather toward a thermally conductive metallic member, preferably in the form of a plate which is located remote from the faceplate of the CRT and has an optically reflective, flat and polished upper surface directed at least partially toward the faceplate and on which surface the phosphor screen is deposited. The metal plate-like member is in heat exchange relation with free air or with liquid or gaseous coolant-containing ducts and/or with external heat-dissipating fins on its lower surface, to enable the heat generated by the electron beam striking the phosphor screen to be conducted away from the latter. The optical image developed in the phosphor screen is concurrently reflected by the upper surface of the metal plate-like member toward and through the faceplate of the CRT so as to pass, preferably via a suitable lens assembly, to a TV or theater display screen. It should be noted, in this regard, that the CRT must be constructed so as to avoid the generation of any artificial radioactivity and that at least the faceplate of the CRT, and also the envelope of the CRT if it is not otherwise opacified, must be made of lead glass or the like which is opaque to X-rays.

In the basic implementation of the present invention, the phosphor screen is constituted of a single essentially homogeneous monochrome phosphor layer formed on the metal plate-like member in any suitable way known per se, e.g., by vapor deposition or otherwise. It will be understood, therefore, that the image generated by such a phosphor will always be a monochrome image and will be so projected toward the display screen. Where the system of the present invention is, however, to be used to produce color images, it is contemplated that the system will be modified somewhat to achieve that goal. In one such modification, a projected high resolution, high light output field sequential video color image is generated with the aid of means for converting the monochrome image to a color image. The conversion can be effected, for example, through the provision, as an adjunct to the CRT, of a device in the form of either a color wheel with three circumferentially distributed primary color (red, blue and green) sections or a liquid crystal shutter which constitutes a red-blue-green color filter, with such device being effectively interposed between the metal plate-like member of the CRT and the associated display screen, and with the instantaneous rotational position of the motor-driven color wheel or the instantaneous color filter state of the liquid crystal shutter being synchronized with the red, blue and green video chroma signals applied via a suitable multiplexer system to the control grid of the CRT. Alternatively, the color image can be generated by utilizing in the CRT an array of primary color phosphors deposited on the metal plate-like member in lieu of the monochrome phosphor, with the color phosphor array and an associated beam-indexing trigger pulse-generating system therefor being arranged in a scheme such as is disclosed in U.S. Pat. No. 5,359,266, the entire disclosure of which is incorporated herein by this reference.

BRIEF DESCRIPTION OF THE DRAWINGS

The foregoing and other objects, characteristics and advantages of the present invention will be more clearly understood from the following detailed description of various embodiments thereof when read in conjunction with the accompanying drawings, in which:

FIG. 2 is a similar functionally diagrammatic illustration of such a system in which a synchronized rotating color wheel is used to generate a projected high resolution, high light output field sequential video color image from the monochrome phosphor;

FIGS. 4 and 5 are perspective schematic views of two representative types of cooling arrangements for the phosphor screens of the systems shown in FIGS. 1–3.

DETAILED DESCRIPTION OF THE INVENTION

Figure 1:
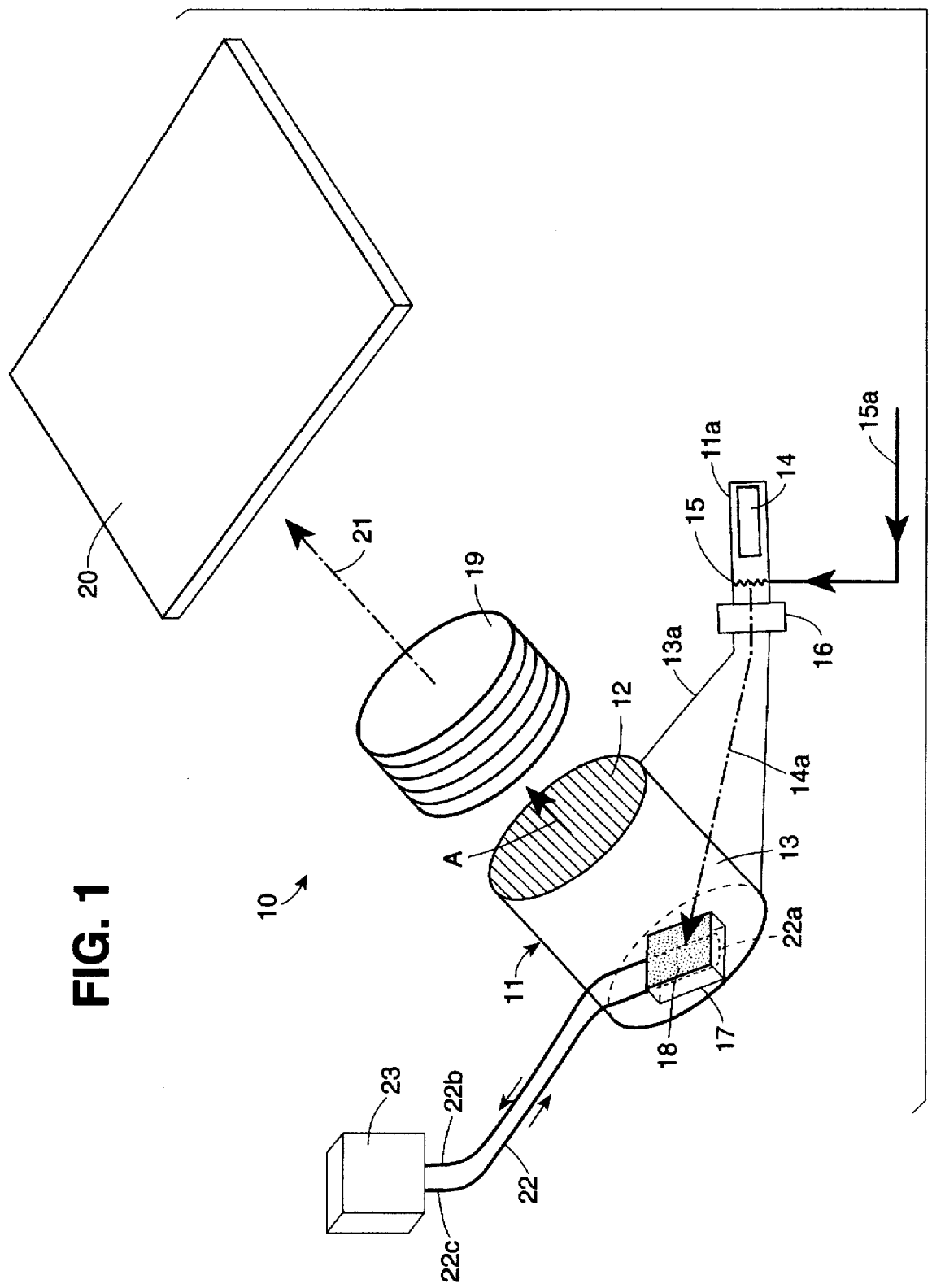
FIG. 1 is a schematic, functionally diagrammatic illustration of a high resolution, high intensity video projection system according to the present invention which embodies a monochrome phosphor deposited on a cooled optically reflective surface arranged within the CRT but at a location remote from the faceplate of the CRT.

Referring now to the drawings in greater detail, there is shown in FIG. 1 a system 10 according to the present invention for generating a projected high resolution, high light output monochrome video image. The system 10 includes a projection cathode ray tube 11 having a glass faceplate 12 normal to the axis A of the CRT and an envelope 13 a portion 13a of which extends at a lateral offset to the axis A. The CRT is provided at a neck portion 11a thereof at the remote end of the envelope portion 13a with an electron gun 14, a control grid 15 to which video input signals are applied via a line 15a, and a deflection yoke 16, by means of which a high intensity electron beam 14a emitted by the electron gun 14 is directed along a path, determined at least in part by the deflection yoke 16, which intersects the axis A of the CRT at any suitable angle (not necessarily a right angle) at a location remote from the faceplate 12. Within the CRT 11, at a location remote from the faceplate 12 (which may be the location of the intersection of the electron beam with the axis A), there is provided a metal plate-like member 17 which is highly thermally conductive and has a plated and highly polished, optically flat and mirror-like reflective upper surface and a lower surface, of which the former is directed toward both the electron gun 14 and the faceplate 12 and has deposited thereon a monochrome phosphor screen 18. A lens system 19 is located exteriorly of the CRT between the faceplate 12 and a suitable display screen 20. The arrangement is such, taking into account the influence of the deflection yoke 16 on the path of the electron beam 14a and the angular orientation of the optically reflective upper surface of the member 17 relative to the path of the electron beam and the axis of the CRT, that when the electron beam strikes the phosphor screen 18, the resultant optical image, which is generated by the phosphor screen and is generally denoted by the dot-dash arrow 21, is reflected by the upper surface of the plate-like member 17 along the axis A of the CRT toward the faceplate 12. The image thus passes through the faceplate 12 and the lens system 19 and is projected, after being focussed by the lens system, onto the display screen 20.

It will be understood, therefore, that since the phosphor screen is not supported by the faceplate of the cathode ray tube and since the electron beam never strikes the faceplate, the arrangement of the present invention ensures that the faceplate cannot become heated, so that the previously mentioned risks of thermal stresses being created between the faceplate and the envelope of the CRT and of temperature differentials arising between the center and the edge regions of the faceplate are effectively avoided. At the same time, however, it is essential to take steps to prevent the previously mentioned possibility of overheating and burning of the phosphor screen and of a resultant blurring or blooming of the image.

To this end, the metal member 17, by virtue of its high thermal conductivity, serves as a heat sink for absorbing the heat generated in the phosphor screen by the incident high intensity electron beam 14a, and associated cooling means is provided in heat exchange relation with the metal plate-like member to cause the heat absorbed by the member 17 to be efficiently conducted away therefrom. In the embodiment of the invention shown in FIG. 1, the cooling means for the member 17 of the system 10 (see also FIG. 4) comprises at least one duct 22 having at least a portion 22a thereof located either interiorly of the member 17 and running therethrough or exteriorly of the member 17 and running over the lower surface thereof (in either case, of course, in heat exchange relation with the member 17) so as to permit a moving cooling fluid, e.g., air or another gaseous coolant or alternatively water or another liquid coolant, to flow over the member 17. In such an arrangement, it will be apparent, a suitable circulating device 23 (see FIG. 1), such as a blower or a pump or the like which has its intake and discharge ports (not shown per se) connected to respective ends 22b and 22c of the duct 22, will normally be provided to cause the cooling fluid to flow and be circulated through the duct 22.

In accordance with a further aspect of this embodiment of the present invention, the metal plate-like member 17, from which some of the absorbed heat will also be extracted by radiation, may additionally be provided, as shown in phantom outline in FIG. 4, with at least one metal fin 24, and preferably with a series of such fins, to enhance the rate of radiation, and thereby the overall rate of extraction, of heat from the member 17. Such a fin or fins, though shown as being connected in heat exchange relation to the lower surface of the member 17 (or possibly, if the portion 22a of the associated duct 22 is located exteriorly of the member 17, at least in part to the exposed duct portion 22a), may alternatively, especially if space considerations in the construction of the cathode ray tube so dictate, be connected to one or more of the peripheral boundary or side surfaces of the member 17.

The cooling of the metal plate-like member 17 can also be effected without the use of a duct or ducts 22. Merely by way of example, in accordance with this variant of the invention (see FIG. 5) the cooling could be effected merely through the exposure of the member 17 to ambient air, which may either be stationary free air or, as schematically indicated by the arrow 25, a stream of free air drawn or blown over the member 17 by a fan or the like (not shown). In either case, the extraction of heat from the member 17 can also be enhanced by the provision of at least one metal fin 24 (or a series of such fins) as indicated in phantom outline in FIG. 5. As mentioned above, the fins need not be connected only to the lower surface of the member 17 but may be connected instead or in addition to its peripheral side surfaces.

Figure 3:
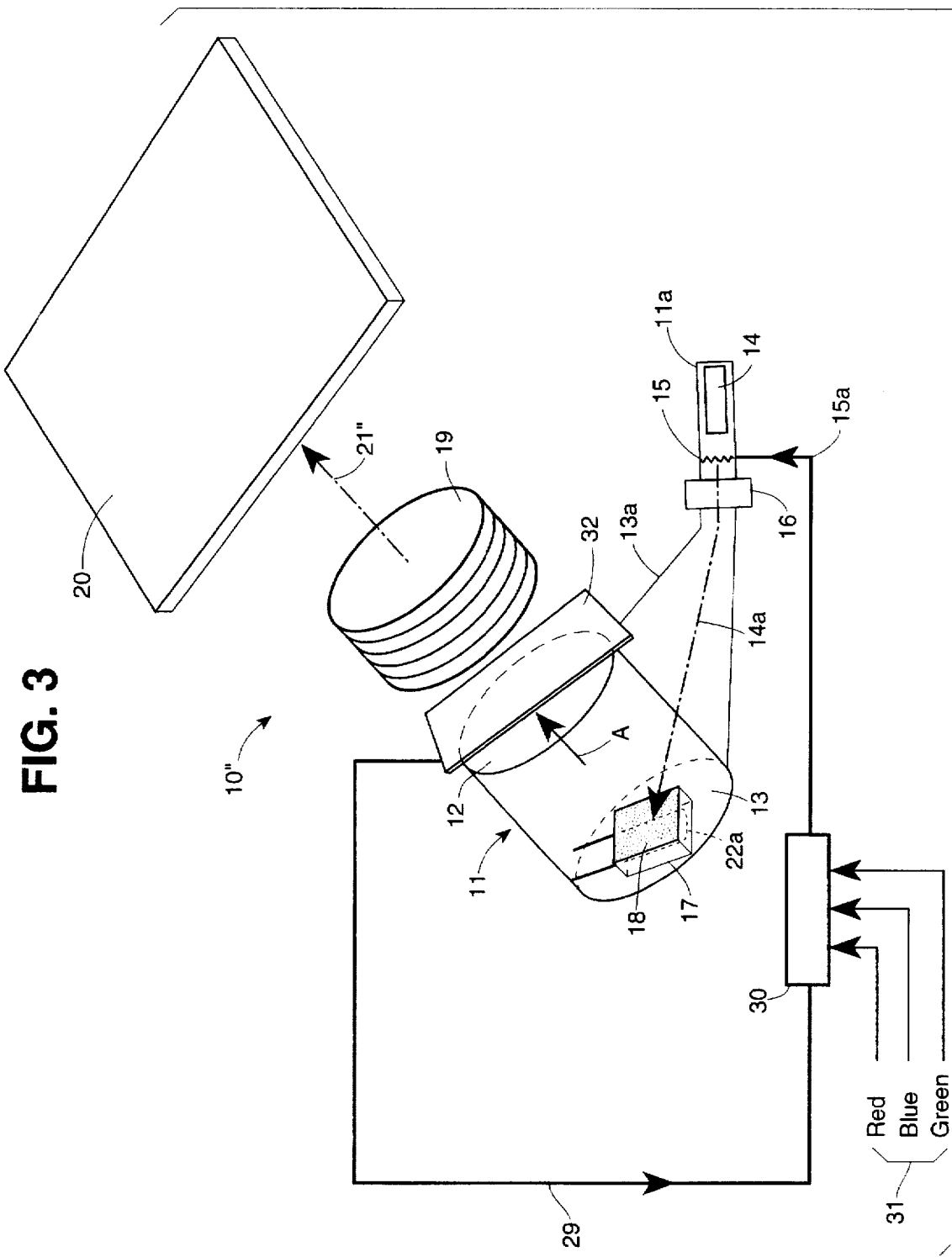
FIG. 3 is yet another functional diagram which illustrates the system of the present invention when used with a synchronized liquid crystal shutter constituting a red-blue-green color filter to generate the projected field sequential color image from a monochrome phosphor.

Turning now to FIGS. 2 and 3, the systems 10' and 10" there shown in essence are almost identical with the system 10 shown in FIG. 1 but differ therefrom only in that the systems 10' and 10" are provided with means, more fully described hereinafter, for converting the monochrome image generated by the phosphor screen to a color image. Basically, therefore, the system 10' and the system 10" each includes (with elements the same as those in FIG. 1 being designated by the same reference numerals in FIGS. 2 and 3) a projection cathode ray tube 11 having a glass faceplate 12 normal to the axis A of the CRT and an envelope 13 a portion 13a of which extends at a lateral offset to the axis A. The CRT is provided at a neck portion 11a thereof at the remote end of the envelope portion 13a with an electron gun 14, a control grid 15 to which video input signals are applied via a line 15a, and a deflection yoke 16, by means of which a high intensity electron beam 14a emitted by the electron gun 14 is caused to flow in a path, determined at least in part by the deflection yoke 16, which intersects the axis A of the CRT at a location remote from the faceplate 12. Within the CRT 11, at a location remote from the faceplate 12, there is provided a metal plate-like member 17 which is highly thermally conductive and has a plated and highly polished, optically flat and mirror-like reflective upper surface and a lower surface, of which the former is directed toward both the electron gun 14 and the faceplate 12 and has deposited thereon a monochrome phosphor screen 18. A lens system 19 is located exteriorly of the CRT between the faceplate 12 and a suitable display screen 20. The cooling means, which as previously described may entail merely an exposure of the member 17 to stationary or moving free air, is (by way of example only) shown in FIGS. 2 and 3 as comprising at least one duct 22 having at least a portion 22a thereof located either interiorly of the member 17 and running therethrough or exteriorly of the member 17 and running over the lower surface thereof (in either case, of course, in heat exchange relation with the member 17) so as to permit a moving cooling fluid, e.g., air or another gaseous coolant or alternatively water or another liquid coolant, to flow over the member 17. As previously indicated, the cooling means may also comprise a fin or fins 24.

In the embodiment of FIG. 2, the components of the system 10' which serve to convert the monochrome image generated by the phosphor screen to a color image include a rotating color wheel 26 having three circumferentially distributed primary color sections (red, blue and green) 26a, 26b and 26c. The wheel is located exteriorly of the CRT in close proximity to the outer surface of the faceplate 12 and substantially parallel thereto and is driven by a motor 27, the wheel being arranged to have its circumferentially outer region and thereby the radially outer regions of the color sections 26a, 26b and 26c pass between the faceplate of the CRT and the lens system 19 in the path of projection of the monochrome optical image from the metal plate-like member 17 to the display screen 20. Associated with the color wheel is a means in the form of a stator 28 for sensing the instantaneous rotational positions of the wheel, with the resultant corresponding signals being transmitted via a line 29 to a multiplexer 30 for controlling the latter. The standard red, blue and green video chroma signals 31 are fed into the input of the multiplexer from a work station or television set and are delivered at its output to the line 15a as gated video input signals for application to the control grid 15 in a sequence synchronized with the positions of the color sections of the rotating color wheel.

The arrangement thus is such that when the electron beam strikes the phosphor screen 18, first the resultant monochrome optical image generated by the phosphor screen is reflected by the upper surface of the plate-like member 17 along the axis A of the CRT toward the faceplate 12 and passes through the faceplate. The monochrome image is then converted by the operation of the rotating color wheel 26 into a field sequential color image 21' and is directed through the lens assembly 19 onto the television or theater display screen 20. As in the embodiment of FIG. 1, the heat developed in the phosphor screen 18 is absorbed by the metal plate-like member 17 and is then extracted therefrom either by radiation or by convection or by being transferred to a moving cooling fluid such as forced air directed at the member 17 or a circulating liquid or gaseous coolant fed through a duct system at least a part of which is arranged in heat exchange relation with the member 17.

The embodiment of the invention shown in FIG. 3 differs from that shown in FIG. 2 only in that the conversion of the monochrome image reflected by the member 17 through the faceplate 12 into a field sequential color image 21" is effected by a type of filter 32 known as a liquid crystal shutter which is positioned in the path of projection of the monochrome optical image from the metal plate-like member to the display screen. In the illustrated arrangement, the liquid crystal shutter 32 is disposed externally of the CRT between the faceplate 12 and the lens system 19, but it could possibly be disposed internally of the CRT. The liquid crystal shutter 32 is a red-green-blue color filter such as is disclosed in U.S. Pat. No. 5,347,378 and is available commercially from the patent owner, Displaytech Inc. of Boulder, Colo., under the trademark "RGB FASTfilter." The salient property of the "RGB FASTfilter" liquid crystal shutter is in essence that it can be switched at very high speeds, by virtue of the manufacturer's patented ferroelectric liquid crystal technology embodied therein, between the three primary colors red, green and blue. In the system illustrated in FIG. 3, the instantaneous color filter state of the liquid crystal shutter 32 is represented by coordinating signals applied to the multiplexer 30 via the line 29 and synchronized with the video chroma signals 31. Thus, through the provision of the liquid crystal shutter 32 in the system 10" the monochrome image produced by the phosphor screen 18 is converted into a field sequential color image.

As previously mentioned, the underlying concept of the present invention can also be implemented in a system utilizing beam indexing type color CRTs such as are disclosed in U.S. Pat. No. 5,359,266. In such a system, a phosphor screen consisting of alternating red, blue and green phosphor strips in groups of three would be provided on the cooled metal plate-like member 17 in place of the monochrome screen 18, with strips of conductive or photovoltaic material overlying each phosphor strip or being placed between adjacent phosphor strips. The red, the blue and the green color strips are connected in parallel in three arrays and are connected to three individual trigger buses. The conductive strips are connected to a positive bias voltage, such that when the electron beam within the CRT strikes a conductive strip, a pulse is generated and fed to the corresponding trigger bus. As the electron beam scans the screen, therefore, trigger pulses are generated in the conductive strips and are fed, if need be via a trigger pulse amplifier, to a multiplexer and used as control signals. The multiplexer in turn gates the color video signals from the workstation or television set such that the corresponding video signal for that color is modulating the beam as the electron beam strikes a corresponding color phosphor strip. The high intensity electron beam thus, as in the embodiments of FIGS. 1, 2 and 3, only strikes the phosphor screen on the member 17. Consequently, any heat generated in the phosphor screen is dissipated through the member 17 and extracted therefrom by radiation or convection or by transfer to a moving cooling fluid such as forced air or a duct-contained circulating gaseous or liquid coolant, and no heat is transmitted to the faceplate of the CRT because there is no phosphor screen deposited on the faceplate. In this way, a possibly deleterious heating of the faceplate by the electron beam is avoided.

Summarizing the foregoing, it can be seen that through the use of a high thermal conductivity, cooled, reflective, metal support member coated with a phosphor screen and located remote from the faceplate of the CRT, the present invention makes it possible to conduct the heat generated in the phosphor screen by a high intensity electron beam to an external cooling means without permitting that heat to reach the faceplate of the CRT. The present invention thus is of great significance, because the ability to produce a very high brilliance image requires a very intense electron beam which in turn requires the ability to remove a large amount of heat from the phosphor screen.

It will be understood that the foregoing description of various embodiments of the present invention is for purposes of illustration only, and that the various structural and operational features herein disclosed are susceptible to a number of modifications and changes none of which entails any departure from the spirit and scope of the present invention as defined in the hereto appended claims.

We claim:

1. A single-gun projection cathode ray tube for generating a projected high resolution, high light output video image, the cathode ray tube having an axis, a glass faceplate transverse to said axis, an electron gun for generating a high intensity electron beam, a control grid positioned across the path of the electron beam out of said electron gun and connected for receiving video signals, and a phosphor screen interposed between the electron gun and the faceplate and adapted, when impinged upon by the electron beam, to generate optical images for transmission through said faceplate; wherein the improvement comprises:

(a) said electron gun is arranged to initially direct said high intensity electron beam along a path transverse to and intersecting said axis at a location remote from said faceplate of the cathode ray tube;

(b) a thermally conductive metal plate-like member is arranged in the cathode ray tube at a location remote from said faceplate and has an optically reflective first surface directed toward both said electron gun and said faceplate;

(c) the phosphor screen is supported by said metal plate-like member on said first surface thereof in a position to be struck by said high intensity electron beam and to generate resultant corresponding optical images, and said optically reflective first surface of said metal plate-like member serves to reflect said optical images developed on said phosphor screen toward said faceplate of the cathode ray tube for passage therethrough to a display screen; and (d) cooling means are provided in heat exchange relation with said metal plate-like member for conducting heat, generated in said phosphor screen by said high intensity electron beam, away from said phosphor screen;

whereby the arrangement allows a very high intensity electron beam to be used in the cathode ray tube without permitting the electron beam to impinge upon and heat said faceplate and without any risk of overheating or burning of said phosphor screen.

2. A projection cathode ray tube according to claim 1, wherein said cooling means is the thermal path from said phosphor screen to said metal plate-like member and thence to a heat-absorbing medium comprising free air.

3. A projection cathode ray tube according to claim 1, wherein said cooling means is the thermal path from said phosphor screen to said metal plate-like member and thence to a heat-absorbing medium comprising a moving cooling fluid.

4. A projection cathode ray tube according to claim 2 or 3, wherein said cooling means comprises at least one metal fin located exteriorly of said metal plate-like member and in heat exchange relation therewith to enhance the extraction of heat from said metal plate-like member.

5. A projection cathode ray tube according to claim 3, wherein said moving cooling fluid is air or another gaseous coolant.

6. A projection cathode ray tube according to claim 3, wherein said moving cooling fluid is water or another liquid coolant.

7. A projection cathode ray tube according to claim 3, wherein said cooling means comprises at least one duct traversing at least a portion of the expanse of said metal plate-like member in heat exchange relation therewith for guiding said moving cooling fluid past said metal plate-like member for extracting heat therefrom.

8. A projection cathode ray tube according to claim 7, wherein said at least one duct has at least a portion thereof located interiorly of said metal plate-like member.

9. A projection cathode ray tube according to claim 7, wherein said metal plate-like member has a second surface, and said at least one duct has at least a portion thereof located exteriorly of said metal plate-like member and in thermal transfer contact with said second surface of the metal plate-like member.

10. A system for generating a projected high resolution, high light output field sequential video monochrome image, comprising:

a single-gun projection cathode ray tube as claimed in claim 1, wherein said phosphor screen is composed of a monochrome phosphor and develops a monochrome optical image;

a display screen located exteriorly of said cathode ray tube transverse to the path of projection of said optical image through said faceplate of said cathode ray tube; and a lens system interposed between said faceplate of said cathode ray tube and said display screen for focusing the projected optical image onto said display screen.

11. A system for generating a projected high resolution, high light output field sequential video color image, comprising:

a single-gun projection cathode ray tube as claimed in claim 1, wherein said phosphor screen is composed of a monochrome phosphor and develops a monochrome optical image;

a display screen located exteriorly of said cathode ray tube transverse to the path of projection of said optical image through said faceplate of said cathode ray tube;

a lens system interposed between said faceplate of said cathode ray tube and said display screen for focusing the projected optical image onto said display screen; and means associated with said cathode ray tube for converting said monochrome optical image to a field sequential color image.

12. A system according to claim 11, wherein said converting means comprises:

(a) a motor-driven rotating color wheel positioned exteriorly of said cathode ray tube between said faceplate of the latter and said display screen;

(b) multiplexer means for selectively applying red, blue and green video chroma signals to said control grid; and (c) means for sensing the instantaneous rotational position of said color wheel and applying a resultant output signal to said multiplexer means for correspondingly and in synchronism with said rotating color wheel controlling the video signals applied by said multiplexer means to said control grid.

13. A system according to claim 11, wherein said converting means comprises:

(a) a liquid crystal shutter constituting a red, blue and green color filter, said liquid crystal shutter being positioned in the path of projection of said monochrome optical image from said first surface of said metal plate-like member to said display screen;

(b) multiplexer means for selectively applying red, blue and green video chroma signals to said control grid; and (c) means for sensing the instantaneous red, blue or green color filter state of said liquid crystal shutter and applying a resultant output signal to said multiplexer means for correspondingly and in synchronism with said liquid crystal shutter controlling the video signals applied by said multiplexer means to said control grid.

14. A system according to claim 11, 12 or 13, wherein said cooling means in said cathode ray tube is the thermal path from said phosphor screen to said metal plate-like member and thence to a heat-absorbing medium comprising free air.

15. A system according to claim 14, wherein said cooling means in said cathode ray tube comprises at least one metal fin located exteriorly of said metal plate-like member and in heat exchange relation therewith to enhance the flow of heat from said metal plate-like member to said heat-absorbing medium.

16. A system according to claim 11, 12 or 13, wherein said cooling means in said cathode ray tube is the thermal path from said phosphor screen to said metal plate-like member and thence to a heat-absorbing medium comprising a moving cooling fluid.

17. A system according to claim 16, wherein said cooling means in said cathode ray tube comprises at least one metal fin located exteriorly of said metal plate-like member and in heat exchange relation therewith to enhance the flow of heat from said metal plate-like member to said heat-absorbing medium.

18. A system according to claim 17, wherein said moving cooling fluid is air or another gaseous coolant.

19. A system according to claim 17, wherein said moving cooling fluid is water or another liquid coolant.

20. A system according to claim 17, wherein said cooling means comprises at least one duct traversing at least a portion of the expanse of said metal plate-like member in heat exchange relation therewith for guiding said moving cooling fluid past said metal plate-like member for extracting heat therefrom.

21. A system according to claim 20, wherein said at least one duct has at least a portion thereof located interiorly of said metal plate-like member.

22. A system according to claim 20, wherein said metal plate-like member has a second surface, and said at least one duct has at least a portion thereof located exteriorly of said metal plate-like member and in thermal transfer contact with said second surface of the latter.

* * * * *